US009152457B2

(12) United States Patent
Winn et al.

(10) Patent No.: US 9,152,457 B2
(45) Date of Patent: Oct. 6, 2015

(54) PROCESSING REQUEST MANAGEMENT

(75) Inventors: Geoffrey Martin Winn, Hampshire (GB); Neil George Young, Southampton (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1005 days.

(21) Appl. No.: 12/775,732

(22) Filed: May 7, 2010

(65) Prior Publication Data

US 2010/0312883 A1 Dec. 9, 2010

(30) Foreign Application Priority Data

Jun. 5, 2009 (EP) .................................... 09162077

(51) Int. Cl.

*G06F 15/173* (2006.01)
*G06F 9/44* (2006.01)
*G06F 15/16* (2006.01)
*H04B 7/14* (2006.01)
*G06F 9/48* (2006.01)

(52) U.S. Cl.

CPC .................................... *G06F 9/4881* (2013.01)

(58) Field of Classification Search

USPC .......................................................... 709/224
See application file for complete search history.

(56) References Cited

U.S. PATENT DOCUMENTS 5,278,984 A * 1/1994 Batchelor ..................... 719/314
6,968,359 B1 * 11/2005 Miller et al. ................. 709/205
2007/0183330 A1 8/2007 Salt

FOREIGN PATENT DOCUMENTS

CN 1338687 A 3/2002

* cited by examiner

*Primary Examiner* — Tonia L Dollinger
*Assistant Examiner* — Kishin G Belani
(74) *Attorney, Agent, or Firm* — Steven L. Nichols; Van Cott, Bagley, Cornwall & McCarthy P.C.

(57) ABSTRACT

A method for executing a plurality of processing requests performed by a physical computing system that is programmed to execute the processing requests for clients includes, with the physical computing system, assigning an identification number to a new processing request; with the physical computing system, placing the new processing request into a process eligible group if the identification number of the new processing request meets a criterion; and with the physical computing system, placing the processing request into a queued group if the identification number of the processing request does not meet the criterion.

25 Claims, 5 Drawing Sheets

300
START
Receive a request (step 302)
Assign the request an identification number (step 304)
Is the ID number greater than the oldest ID number in the process eligible group plus the span (decision 306)
YES
NO
Add the request to the queue group (step 308)
Add request to the process eligible group (step 310)
Are there any additional requests (decision 312)
YES
NO
END

PROCESSING REQUEST MANAGEMENT

CROSS-REFERENCE TO RELATED APPLICATIONS

The present application claims priority pursuant to 35 U.S.C. §119(a) from European Patent Application No. 09162077.3, filed on Jun. 5, 2009, which is incorporated herein by reference in its entirety.

BACKGROUND

Aspects of the present invention relate in general to process management, and more particularly, to managing the processing of requests in a manner that provides high throughput without neglecting the processing of some processing requests.

A service oriented architecture is one in which a processing entity may outsource processing requests to a number of remote processing systems. These remote processing servers may further outsource a processing request to other remote processing systems. Service oriented architecture may organize applications as a hierarchy or even as a web of interacting services.

To provide efficient throughput of the system, a computing system which is processing requests should be able to continue to respond to its clients while waiting for responses from various servers over which it has little or no control. To do so, computing systems are often configured with the capability to process multiple requests in parallel. Thus, when some requests are held up for various reasons, there may be other requests which are able to be processed. The aim of such an approach is to typically maximize throughput in the service provider and not necessarily to minimize the response time of the server systems to which processing requests are sent.

However, this approach presents some challenges. For example, if the number of requests that are currently in progress becomes too large, the effort required to manage them can become significant and might actually degrade performance. Furthermore, there is also the possibility that the functions which decide the order in which processing requests are processed may neglect a particular request in favor of others. This may lead to unnecessarily long delays. For example, if the computing system is trying to work on several requests in parallel, it is possible that one request will be neglected while other requests receive a disproportionately large share of the available processing time.

BRIEF SUMMARY

A method for executing a plurality of processing requests performed by a physical computing system, the method includes, with the physical computing system, assigning an identification number to a new processing request; with the physical computing system, placing the new processing request into a process eligible group if the identification number of the new processing request meets a criterion; and with the physical computing system, placing the processing request into a queued group if the identification number of the processing request does not meet the criterion; wherein the physical computing system is configured to allow processing of process requests from the process eligible group and not the queued group.

A physical computing system includes a processor and a memory communicatively coupled to the processor. The processor is configured to assign an identification number to a new processing request; place the new processing request into a process eligible group if the identification number of the new processing request meets a criterion; and place the processing request into a queued group if the identification number of the processing request does not meet the criterion; wherein the physical computing system is configured to allow processing of process requests from the process eligible group and not the queued group.

A computer program product for managing process requests for a physical computing system, the computer program product includes a computer readable storage medium having computer readable code embodied therewith. The computer readable program code includes computer readable program code configured to assign an identification number to a new processing request; computer readable program code configured to place the new processing request into a process eligible group if the identification number of the new processing request meets a criterion; and computer readable program code configured to place the processing request into a queued group if the identification number of the processing request does not meet the criterion; wherein the computer readable program code is configured to allow processing of process requests from the process eligible group and not the queued group.

A method for managing the execution of processing requests performed by a physical computing system comprising a memory and a processor includes, with the physical computing system, assigning an identification number to a plurality of processing requests; with the physical computing system, assigning one of the plurality of processing requests to a process eligible group if the identification number of the one of the plurality of processing requests is greater than an identification number of the oldest processing request in the process eligible group plus a threshold number; wherein the physical computing system is configured to process requests from the process eligible group and not a queued group.

A server system includes a processor and a memory communicatively coupled to the processor. The processor is configured to assign an identification number to a plurality of new processing requests received from a client system; place one of the plurality of new processing requests into a process eligible group if the identification number of the one of the plurality of new processing request meets a criterion; and place one of the plurality of new processing requests into a queued group if the identification number of the one of the plurality of processing requests does not meet the criterion; wherein the server is configured to allow processing of process requests from the process eligible group and not the queued group.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
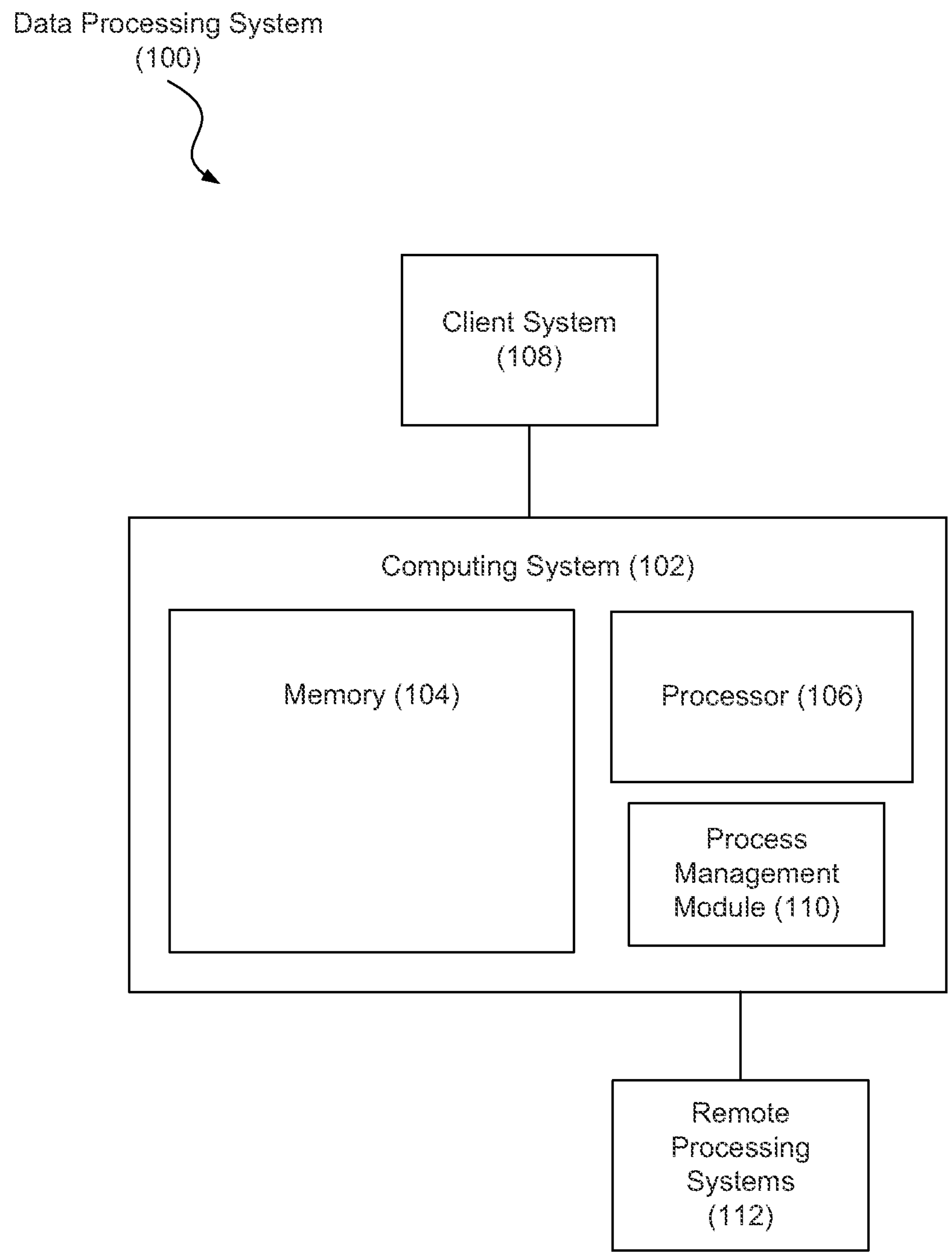
FIG. 1 is a block diagram of a data processing system, according to one embodiment of principles described herein.

The present specification discloses systems and methods for managing processing requests of a physical computing system. According to certain illustrative embodiments, a computing system may assign an identification number to a new processing request. The new processing request may be self generated or received from a client system. The identification number may be assigned based on the order in which the request was received. The newly received processing request may then be placed either in a process eligible group or a queued group. Whether an incoming processing request is placed in the process eligible group or the queued group may depend on whether or not the identification number assigned to the incoming request meets a specific criterion. The computing system may be configured to execute the processing requests from the eligible group. In some cases, processing requests may be outsourced to a remote server. Upon completing a request from the process eligible group, the void may be filled with a processing request from the queued group.

Through use of a method or system embodying principles described herein, multiple requests may be processed in parallel. However, any particular processing request will not be neglected. Thus, the throughput of the system may be maintained without the potential for neglecting a particular processing request, allowing a data processing system with increased performance to be realized.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Throughout this specification and in the appended claims, the term "server" is to be broadly interpreted as a computing system able to serve received processing requests from a sender. The term "client" is to be broadly interpreted as a computing system which sends a processing request to another computing entity. A computing system may act as both a client system and a server system.

With reference now to the figures, FIG. 1 is a diagram showing an illustrative data processing system (100). According to certain illustrative embodiments, the data processing system (100) may include a client system (108), a computing system (102) including a processor memory (104), a processor (106), and a process management module (110). The computing system may outsource processing requests to remote computing servers (112).

The computing system (102) may be any system which receives a request from a client system (108) and has the option to pass the request to a remote processing system (112). For example, the computing system (102) may act as a server receiving a request from a client system (108). The computing system (102) may then pass the processing request on to a variety of remote processing servers (112). The computing system (102) may also be capable of processing requests on its own. The computing system (102) may have the capability to handle several processing requests in parallel.

The client system (108) may be any system or device which makes processing requests to the computing system (102). The client system may be a laptop or a desktop computer. In some embodiments, the client system may be a particular hardware module within the computing system (102) itself.

The remote computing servers (112) may be any type of physical computing systems capable of processing requests. As the computing system (102) receives requests from a client, of generates requests itself, the computing system (102) may pass those requests onto various remote processing servers. Some remote processing servers may be configured to process requests for specific applications or subcomponents of applications. Thus, the computing system may have multiple requests which need to be processed by remote processing systems. These remote processing systems may also further pass on the processing requests.

A typical physical computing system (102) generally includes a form of memory (104). There are many types of memory available. Some types of memory, such as hard disk drives, optical disc drives, and solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software and data. Software includes a set of instructions for a processor (106).

The system (100) may also include a process management module (110). The process management module (110) may manage the processing requests associated with the computing system (102). The process management module will be discussed in more detail below with the text corresponding to FIG. 2

Figure 2:
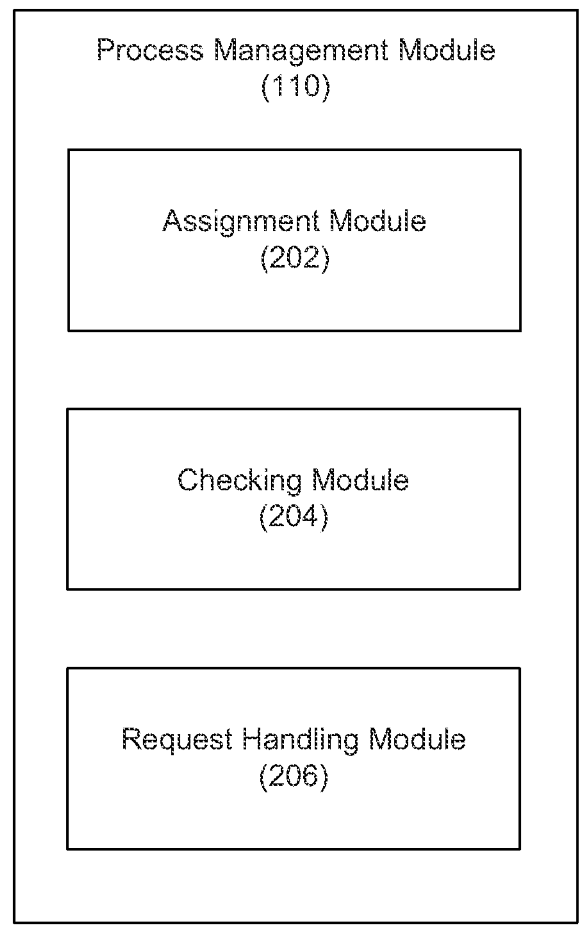
FIG. 2 is a block diagram of a process management module, according to one embodiment of principles described herein.

FIG. 2 is a block diagram of a process management module (110). According to certain illustrative embodiments, the process management module (110) may include an assignment module (202), a checking module (204), and a request handling module (206).

The assignment module (202) is responsible for assigning each incoming process request an identification number. The identification numbers may be assigned based on the order in which the processing requests were received. For example, the first received process request may be assigned an identification number of "1". The next processing request may receive an identification number of "2". The assignment of identification numbers may follow any sequence of numbers, as long as the system has a way of determining the order in which the processing requests were received.

The checking module (204) may be responsible for assigning the processing requests to different groups. The processing requests may either be assigned to a process eligible group or a queued group. The checking module may assign the processing requests to either group based in part on their identification numbers. The checking module (204) may also determine when to move particular processing requests from the queued group to the process eligible group. More detail on how the checking module (204) operates will be discussed below in the text corresponding with FIG. 3 and FIG. 4.

The request handling module (206) may be responsible for actually handling the processing requests. The processing requests may be handled by the computing system itself or sent to the various remote processing servers available. The request handling module may be configured to only handle requests which are in the process eligible group.

The modules described above may be any combination of hardware and software required to execute the tasks described.

Figure 3:
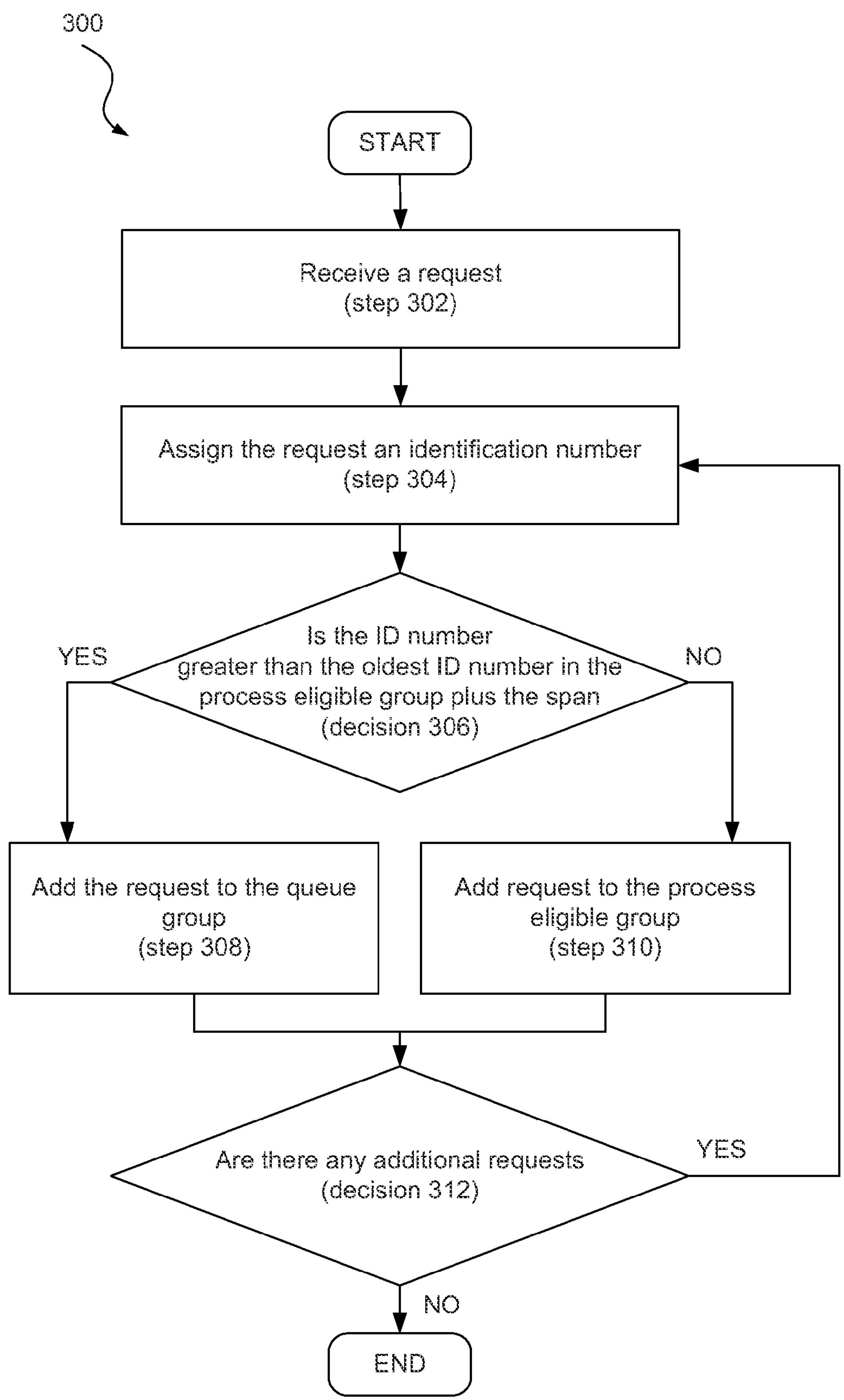
FIG. 3 is a flow chart showing an illustrative method for handling a newly received processing request, according to one embodiment of principles described herein.

FIG. 3 is a flow chart showing an illustrative method (300) for handling a newly received processing request. According to certain illustrative embodiments, the method may include receiving (302) a processing request. This processing request may be self generated or received from a client system (102). After receiving the request, the process management module of a computing system may assign (step 304) the request an identification number.

In some embodiments, the process management module may use a threshold number to throttle the throughput of the system. The threshold number may be an integer which represents the largest permitted difference between the identification numbers of any pair of processing requests processed by the computing system. The threshold number allows for work to be throttled by allowing the computing system (having sufficient capacity) to access and process requests having identification numbers associated with the threshold number but preventing the computing system (110) accessing and processing requests not having identification numbers associated with the threshold number. Thus, a threshold number effectively sets a restraint on the number of processing requests that can be accessed and processed by the computing server at a given time. For purposes of illustration, in this configuration the threshold number is "3".

The checking module (204, FIG. 2) may then be used to determine (decision 306) if the identification number of the received request is greater than the identification number of the oldest processing request in the process eligible group plus the threshold number. If the identification number of the received request is indeed (decision 306, YES) greater than the identification number of the oldest processing request in the process eligible group plus the threshold number, then the computing system may add (step 308) the request to the queued group. If the identification number of the received request is not (decision 306, NO) greater than the identification number of the oldest processing request in the process eligible group plus the threshold number, then the computing system may add (step 310) the request to the process eligible group.

The computing system may then determine (decision 312) if there is any additional processing requests to be received. If there are indeed (decision 312, YES) any additional processing requests to be received, then the computing system may reiterate to step of assigning (step 304) the request an identification number. If there are not (decision 312, NO) any additional processing requests, the process may end.

In one example, a new request is received by the computing system. As this request is the first request, there are no previously assigned identification numbers. Thus, the request may be assigned an identification number of "1". As there are currently no requests in the process eligible group, the process management module may assign the request to the process eligible group.

Continuing the example, when a second processing request is received by the computing system, it may be assigned an identification number of "2". The process management module may then determine if the identification number of the received request is greater than the identification number of the oldest processing request in the process eligible group plus the threshold number (Is 2>(1+3)). As the condition is not met, the new request may also be added to the process eligible group. The next received processing request may be assigned an identification number of "3". The process management module may then check to see if 3>(1+3). As the condition is not met, the new request may also be added to the process eligible group. The next received processing request may be assigned an identification number of "4". The process management module may then determine if 4>(1+3). As the condition is not met, the new request may also be added to the process eligible group.

The next received processing request may be assigned an identification number of "5". The process management module may then determine if 5>(1+3). As this statement is indeed true, the received processing request may then be added to the queued group. The next received processing request may be assigned an identification number of "6". The process management module may then determine if 6>(1+3). As this statement is indeed true, the received processing request may then be added to the queued group.

The process management module thus compares the identification numbers of the newest request and the oldest request against the threshold number (the largest permitted difference between the identification numbers of any pair of processing requests) in order to determine whether the newest request can be added to the process eligible group. The computing system is only permitted to begin work on the newest request if the difference between the identification number of the newest request and that of the oldest request is less than the threshold number.

In some embodiments, the threshold number may be changed by a user, or an operating system at will. For example, if a user or an operating system determines that network traffic is high, or that the system will be processing heavy loads, then the threshold number may be changed to throttle the system to an ideal configuration based on various conditions.

Figure 5A:
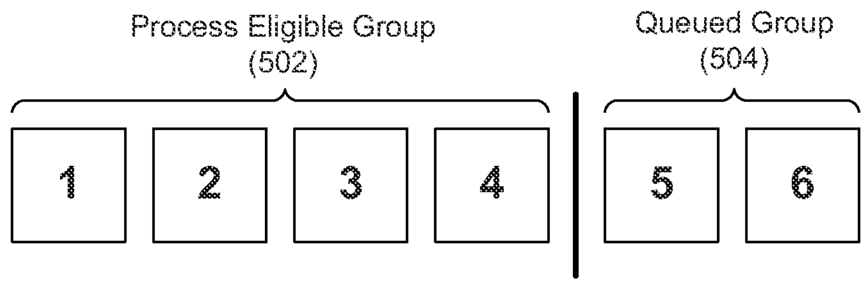
FIGS. 5A-5D are diagrams showing illustrative processing requests in queue, according to one embodiment of principles described herein.

A representation of the resulting processing requests is shown in FIG. 5A, where the first, second, third and fourth requests are associated with the process eligible group (502) and the fifth and sixth requests are not associated with the process eligible group. Rather, they are associated with the queued group (504).

Figure 4:
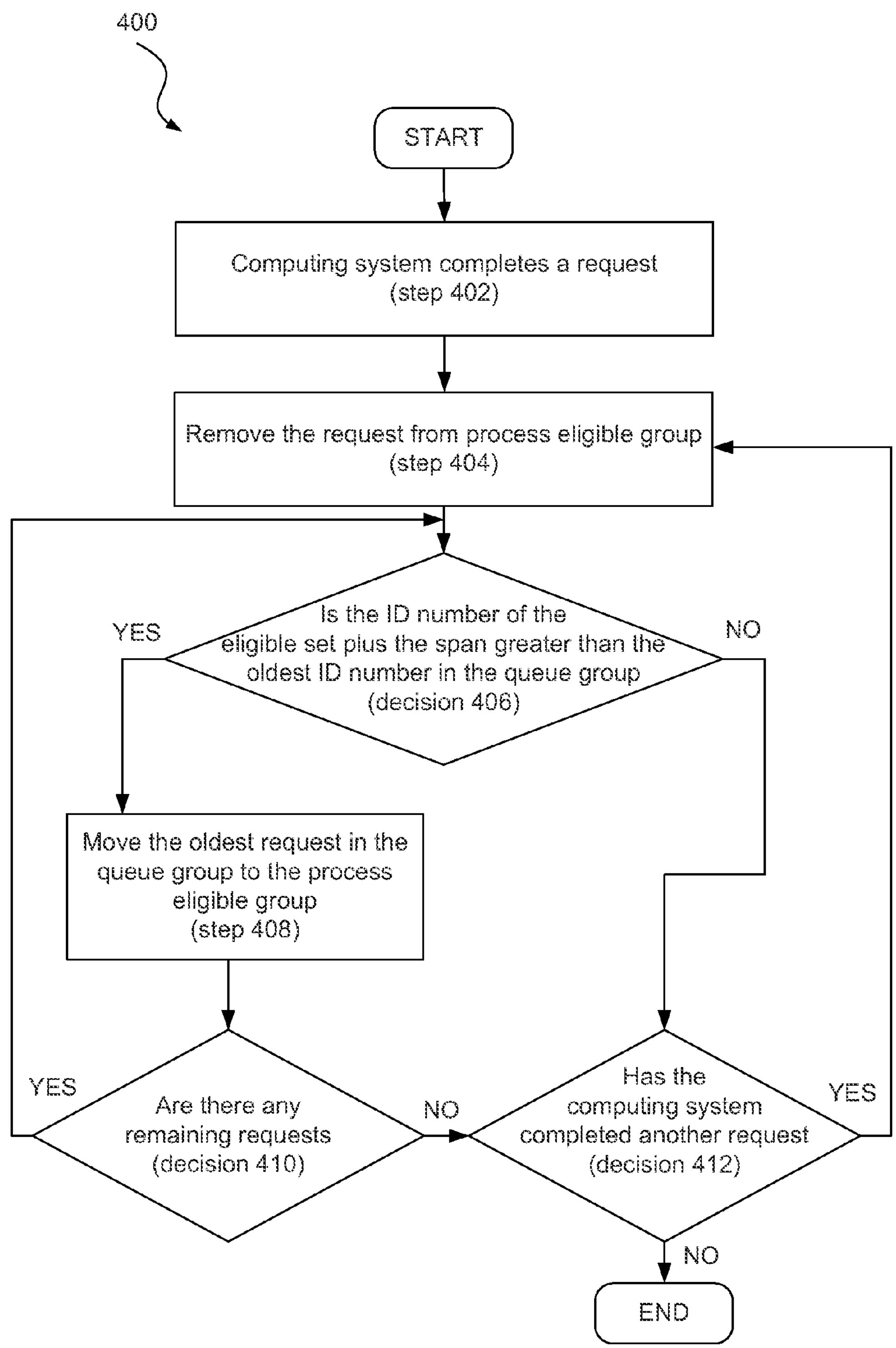
FIG. 4 is a flow chart showing an illustrative method for adding processing requests to a process eligible group, according to one embodiment of principles described herein.

FIG. 4 is a flow chart showing an illustrative method (400) for adding processing requests to a process eligible group. According to certain illustrative embodiments, the method may begin when the computing system completes (step 402) a processing request. The processing request may then be removed (step 404) from the process eligible group.

The process management module may then determine (decision 406) if the identification number of the oldest processing request plus the threshold number is greater than the identification number of the oldest processing request in the queue group. If the identification number of the oldest processing request plus the threshold number is indeed (decision 406, YES) greater than the identification number of the oldest processing request in the queue group, then the process management module may move (step 408) the oldest processing request in the queued group to the process eligible group. If the identification number of the oldest processing request plus the threshold number is not (decision 406, NO) greater than the identification number of the oldest processing request in the queue group, then the method (400) may move on to decision 412.

Upon moving the oldest request from the queued group to the process eligible group, the process management module may then determine (decision 410) if there are any remaining requests in the queued group. If there are indeed (decision 410, YES) remaining process requests in the queued group, then the process may return to step 406. If there are no (decision 410, NO) remaining requests in the queued group, then the method (400) may proceed to decision 412.

The process management module may determine (decision 412) if the computing system has completed another request. If the computing system has indeed (decision 412, YES) completed another request, then the method (400) may proceed to step 404. If the computing system has not completed another processing request (decision 412, NO), then the method (400) may be complete.

In some embodiments, the computing system is allowed the flexibility of being able to do work on any of the requests in the process eligible group. Various functions may be designed and implemented to determine the most efficient order in which to work on the processing requests from the process eligible group. The computing system may also be operable to work on multiple processing requests from the process eligible group in parallel. This provides for efficiency as there can be a "pool" of requests to work on if processing of one of the requests stalls (e.g. for a legitimate reason such as that the computing system is waiting for a response from a remote computing system, or that there is an error condition). As mentioned above, the computing system may access various remote servers in order to complete some processing requests.

Figure 5B:
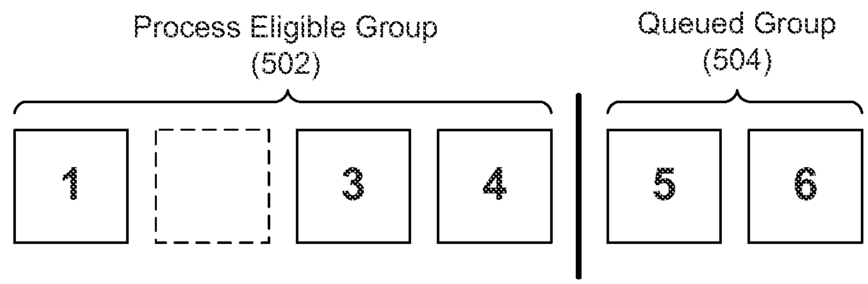

Continuing the above example, the computing system may complete work on the processing request which is assigned the identification number "2". The process management module may then remove the processing request from the process eligible group. The representation of this result is shown in FIG. 5B The process management module may then determine if the identification number of the oldest processing request plus the threshold number is greater than the identification number of the oldest processing request in the queued group ((1+3)>5). This test is to determine if the oldest processing request from the queued group may be moved to the process eligible group. As the condition is not met, the processing request with the identification number "5" is not able to be moved to the process eligible group yet.

Figure 5C:
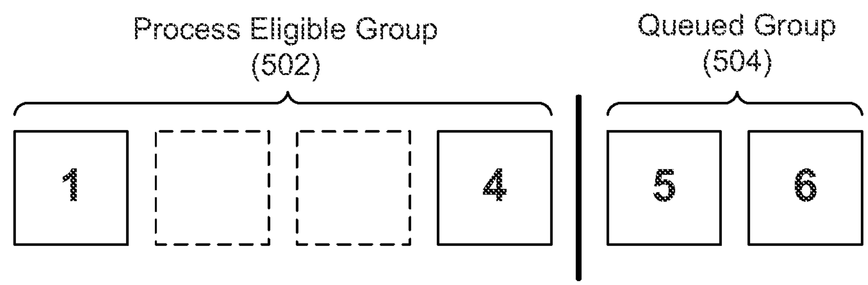

Continuing the above example, the computing system may complete work on the processing request which is assigned the identification number "3". The process management module may then remove the processing request from the process eligible group. The representation of this result is shown in FIG. 5C The process management module may then determine if the identification number of the oldest processing request plus the threshold number is greater than the identification number of the oldest processing request in the queued group ((1+3)>5). As there has been no change in the oldest processing request in the process eligible group, the test is the same. As the condition is not met, the processing request with the identification number "5" is still not able to be moved to the process eligible group yet.

Continuing the above example, the computing system may complete work on the processing request which is assigned the identification number "1". The process management module may then remove the processing request from the process eligible group. The process management module may then determine if the identification number of the oldest processing request plus the threshold number is greater than the identification number of the oldest processing request in the queued group ((4+3)>5). As the condition is now met, the processing request with the identification number "5" is now able to be moved to the process eligible group.

Figure 5D:
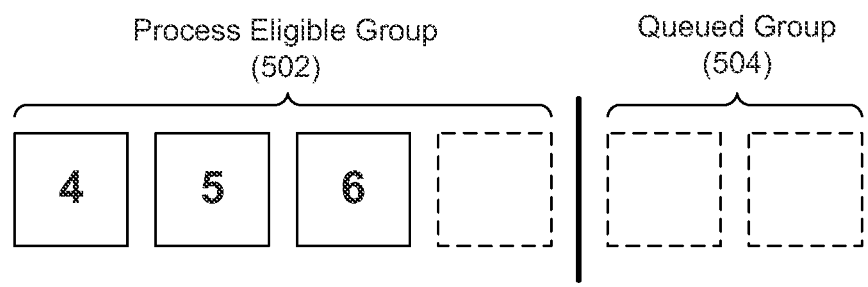

The process management module will now determine if there are any other requests in the queued group. The processing request having been assigned an identification number of "6" is still in the queued group. Thus, the test will be performed again for this processing request. As (4+3)>6, the processing request with the identification number of "6" will also be moved from the queued group to the process eligible group. FIG. 5D is a representation of the resulting grouping of processing requests.

In this example, although multiple requests from the process eligible group have been completed (particularly, the second request and the third request), the process management module does not immediately move the fifth and sixth processing requests into the process eligible group. It may be the case that the first request requires more processing resources than other processing requests. If the process management module were to immediately move the fifth or sixth processing requests into the process eligible group, the computing system may devote more time to those resources and neglect the first processing request. Through use of the methods and systems described herein, processing requests may be handled efficiently by a computing system without neglecting certain requests.

Although the computing system may defer the starting of work on a request (e.g. the first request) that is at the head of the priority in favor of another request behind it (e.g. the second and third requests), if the computing system defers work too often, eventually the difference between the oldest and the waiting requests will be such that the threshold number prevents the computing system (110) starting work on a waiting request until it completes work on at least one of the requests (e.g. the oldest request) in the process eligible group.

Advantageously, the illustrated embodiment allows for a computing system to be "kept busy" by allowing it to efficiently process multiple requests and maximize its throughput. However, the computing system is prevented from being overloaded and from neglecting any one request. These advantages are provided with minimum overhead for the computing system.

In some embodiments, an external entity (such as a load balancing system management tool) is operable to tune the computing system in response to changing circumstances, adapting the computing system in an autonomic computing environment. This will be described in more detail below.

The threshold number is used to vary the number of requests that are available to the computing system at any one time. An external entity is operable to monitor the requests that are affected by the threshold number (e.g. the requests which have to wait while an "old" request completes). As mentioned above, an external entity may include a user or an operating system. The external entity can monitor the number of processing requests in the queued group in order to determine the load currently being experienced by the computing system. In response to the monitoring, the external entity is operable to adjust the threshold numbers based on conditions and a predefined set of rules.

In one example, if in response to the monitoring, the external entity determines that the computing system has too many processing requests in the queue group which have been in the queued group for extended periods of time, the external entity may determine that the server is under-worked. As a result, the external entity may make a recommendation that the threshold number should be increased. In some embodiments, the external entity may simply adjust the threshold number as needed.

In another example, if the external entity determines that the queued group is almost always empty and the threshold number is also forcing requests to wait, this may be due to the computing system being overloaded. Preferably, the external entity makes a recommendation that the number of threads should be increased. Although thread creation is fairly expensive and thread creation may not alleviate the situation if the underlying hardware is already fully committed, by making the recommendation, an administrator is given the option to at least try and alleviate the situation.

Advantageously, in response to the monitoring, the external entity can make recommendations associated with varying the threshold number in order to vary the amount of work that the computing system can do (advantageously, optimising throughput) or investigating where else in the server computing system a bottleneck or unused resources might lay.

Advantageously, a method or system embodying principles described herein provides a number of benefits. For example, it makes "black box" testing much easier. Provided a test harness knows the threshold number for any given service provider, one embodiment allows for the input queue to be checked in order to determine that the threshold number is not violated. In another example, some embodiments also allow for a simple, low-cost strategy for the computing system to process multiple requests in parallel.

In some embodiments, a processing request in the process eligible group that is waiting for an external event to be completed, may itself not be able to be completed. From the remainder of the requests, the computing system is preferably operable to progress a request with the lowest sequence number (namely, an oldest request). This is not necessarily the optimal approach but it is cheap and effective and provides a base level upon which any other approach may improve. This approach also means that the computing system need not be multi-threaded, a design choice that often creates significant coding and runtime burden, e.g. due to the complexities of synchronization and the costs of context switching.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for executing a plurality of processing requests performed by a physical computing system that is programmed to execute said processing requests for clients, the method comprising:

with said physical computing system, assigning an identification number to a new processing request;

with said physical computing system, placing said new processing request into a process eligible group if said identification number of said new processing request meets a criterion; and with said physical computing system, placing said processing request into a queued group if said identification number of said processing request does not meet said criterion.

2. The method of claim 1, wherein said identification number is assigned based on an order in which said new processing request is received relative to other processing requests.

3. The method of claim 1, in which said criterion is that said identification number of said new processing request is less than an identification number of an oldest processing request in said process eligible group plus a threshold number.

4. The method of claim 3, in which said threshold number may be altered by an external management entity based on performance of said physical computing system.

5. The method of claim 4, in which said external management entity is one of: a user, and an operating system.

6. The method of claim 1, further comprising removing a processing request from said process eligible group upon completing that processing request.

7. The method of claim 6, further comprising moving an oldest processing request from said queued group to said process eligible group if an identification number of an oldest processing request from said process eligible group plus said threshold number is greater than an identification number of said oldest processing request from said queued group.

8. The method of claim 1, wherein said new processing request is received from a client computing system.

9. The method of claim 1, wherein a processing request from said process eligible group is sent to a remote processing system for processing.

10. A physical computing system comprising:

a processor; and a memory communicatively coupled to said processor;

in which said processor is configured to:

assign an identification number to a new processing request;

place said new processing request into a process eligible group if said identification number of said new processing request meets a criterion; and place said processing request into a queued group if said identification number of said processing request does not meet said criterion;

wherein said physical computing system is configured to process requests from said process eligible group.

11. The system of claim 10, wherein said criterion is that said identification number of said new processing request is less than an identification number of an oldest processing request in said process eligible group plus a threshold number.

12. The system of claim 10, wherein said processor is further configured to remove a processing request from said process eligible group upon completing that processing request.

13. The system of claim 12, wherein said processor is further configured to move an oldest processing request from said queued group to said process eligible group if an identification number of an oldest processing request from said process eligible group plus said threshold number is greater than an identification number of said oldest processing request from said queued group.

14. The system of claim 10, wherein said identification number is assigned based on an order in which processing requests are received.

15. The system of claim 10, wherein said new processing request is received from a client computing system.

16. The system of claim 10, wherein a processing request from said process eligible group is sent to a remote processing system for processing.

17. A computer program product for managing process requests for a physical computing system, said computer program product comprising:

a non-transitory computer readable storage medium having computer readable code embodied therewith, said computer readable program code comprising:

computer readable program code configured to assign an identification number to a new processing request;

computer readable program code configured to place said new processing request into a process eligible group if said identification number of said new processing request meets a criterion; and computer readable program code configured to place said processing request into a queued group if said identification number of said processing request does not meet said criterion.

18. The computer program product of claim 17, wherein said criterion is that said identification number of said new processing request is less than an identification number of an oldest processing request in said process eligible group plus a threshold number.

19. The computer program product of claim 17, wherein said computer readable program code is further configured to remove a processing request from said process eligible group upon completing that processing request.

20. The computer program product of claim 19, wherein said computer readable program code is further configured to move an oldest processing request from said queued group to said process eligible group if an identification number of an oldest processing request from said process eligible group plus said threshold number is greater than an identification number of said oldest processing request from said queued group.

21. The computer program product of claim 17, wherein said identification number is assigned based on an order in which processing requests are received.

22. A method for managing the execution of processing requests performed by a physical computing system comprising a memory and a processor, the method comprising:

with said physical computing system, assigning an identification number to each of a plurality of processing requests;

with said physical computing system, assigning each said processing requests to a process eligible group if the identification number corresponding to that processing request is less than an identification number of the oldest processing request in said process eligible group plus a threshold number;

wherein said physical computing system is configured to process requests from said process eligible group.

23. The method of claim 22, further comprising assigning a said processing request to said queued group if the identification number corresponding to that processing request is greater than an identification number of the oldest processing request in said process eligible group plus a threshold number.

24. A server system comprising:

a processor; and a memory communicatively coupled to said processor;

in which said processor is configured to:

assign an identification number to each of a plurality of new processing requests based on an order in which said processing requests are received;

sort said programming requests into either a process eligible group or a queued group based on whether a corresponding identification number of that processing request meets a criterion.

25. The server of claim 24, wherein said criterion is that said identification number is less than an identification number of an oldest processing request in said process eligible group plus a threshold number.

* * * * *